(12) United States Patent
Hughes et al.

(10) Patent No.: US 7,872,793 B2
(45) Date of Patent: Jan. 18, 2011

(54) SPATIAL LIGHT MODULATOR

(76) Inventors: Jonathan Rennie Hughes, 4 Hanbury Avenue, St. John's, Worcester, Worcestershire WR2 4JW (GB); Maurice Stanley, QinetiQ Limited, Malvern Technology Centre, St Andrew's Road, Malvern, Worcestershire WR14 3PS (GB)

( * ) Notice: Subject to any disclaimer, the term of this patent is extended or adjusted under 35 U.S.C. 154(b) by 343 days.

(21) Appl. No.: 12/022,109

(22) Filed: Jan. 29, 2008
(Under 37 CFR 1.47)

(65) Prior Publication Data
US 2008/0204853 A1    Aug. 28, 2008

Related U.S. Application Data

(60) Provisional application No. 60/898,167, filed on Jan. 30, 2007.

(51) Int. Cl.
*G02B 26/00* (2006.01)

(52) U.S. Cl. .................................. 359/290; 359/291

(58) Field of Classification Search ................. 359/290, 359/291
See application file for complete search history.

(56) References Cited

U.S. PATENT DOCUMENTS

| | | | |
|---|---|---|---|
| 5,130,830 A | 7/1992 | Fukushima et al. | |
| 5,398,042 A | 3/1995 | Hughes | |
| 5,555,115 A | 9/1996 | Mitsuoka et al. | |
| 5,617,203 A | 4/1997 | Kobayashi et al. | |
| 5,912,758 A | 6/1999 | Knipe et al. | |
| 6,313,820 B1 | 11/2001 | Helbing et al. | |
| 6,437,919 B1 | 8/2002 | Brown | |
| 6,654,156 B1 | 11/2003 | Crossland | |
| 6,930,693 B1 | 8/2005 | Coker | |
| 7,265,893 B2 * | 9/2007 | Hughes et al. | 359/295 |
| 2004/0196524 A1 | 10/2004 | Hughes et al. | |

FOREIGN PATENT DOCUMENTS

| | | |
|---|---|---|
| EP | 0525424 A2 | 2/1993 |
| EP | 0689119 | 12/1995 |
| EP | 1245990 | 10/2002 |
| GB | 2269238 A | 2/1994 |

(Continued)

OTHER PUBLICATIONS

Fukushima, S., et al., "Ferroelectric liquid-crystal spatial light modulator achieving bipolar image operation and cascadability", Applied Optics, Nov. 10, 1992, pp. 6859-6868, vol. 31, issue 32, Optical Society of America, United States of America.

(Continued)

*Primary Examiner*—Ricky L Mack
*Assistant Examiner*—James C Jones
(74) *Attorney, Agent, or Firm*—Stolowitz Ford Cowger LLP

(57) ABSTRACT

A spatial light modulator system includes an optically addressable spatial light modulator (OASLM) and an electrical addressable spatial light modulator (EASLM) arranged to transmit light onto the OASLM. A first controller is configured to address the EASLM with both a positive image and a negative image. A second controller is configured to apply a first bipolar voltage pulse to the OASLM associated with reception of the positive image and apply a second bipolar voltage pulse to the OASLM associated with reception of the negative image.

29 Claims, 11 Drawing Sheets

FOREIGN PATENT DOCUMENTS

| | | |
|---|---|---|
| GB | 2330471 A | 4/1999 |
| GB | 2350962 | 12/2000 |
| JP | 5027256 A | 2/1993 |
| WO | 99/19767 | 4/1999 |
| WO | 99/46768 | 9/1999 |
| WO | 00/38162 | 6/2000 |
| WO | 00/40018 | 7/2000 |
| WO | 2004034137 | 4/2004 |

OTHER PUBLICATIONS

Perennes, F., and Crossland, W. A., "Optimization of ferroelectric liquid crystal optically addressed spatial light modulator performance", Opt. Eng., Aug. 1997, pp. 2294-2301, vol. 36, issue 8, Society of Photo-Optical Instrumentation Engineers, United States of America.

Yim, et al., "Comparison of operation parameters between binary and analogue switching pixellated light values", Optoelectronics IEEE Proc., Aug. 1998, pp. 236-242, vol. 145, issue 4, The Institution of Engineering and Technology, United Kingdom.

Gabor, et al. "Integrating mode for an optically addressed spatial light modulator", Jun. 10, 1993, Applied Optics, OSA, Optical Society of America, Washington, DC, pp. 3064-3067.

* cited by examiner 35V, 1250μs PULSE    19V, 1100μs PULSE
LP, I   TP, NI        LP, NI   TP, I 20V, 1100μs PULSE    35V, 1100μs PULSE
LP, NI   TP, I        LP, I   TP, NI 35V, 1100μs PULSE    35V, 1100μs PULSE
LP, I   TP, NI        LP, I   TP, NI

US 7,872,793 B2

SPATIAL LIGHT MODULATOR

This application claims priority to U.S. Provisional Application Ser. No. 60/898,167 filed on Jan. 30, 2007, the specification of which is herein incorporated by reference.

FIELD OF USE

Spatial light modulator systems using an electrically addressable spatial light modulator and an optically addressable spatial light modulator.

BACKGROUND

Spatial light modulator (SLM) systems may be used in the production of three-dimensional (3D) images, in large area displays, and in controlling and manipulating optical beams. The SLM system may include an electrically addressable spatial light modulator (EASLM.) The EASLM is addressed to produce successive different images which are imaged sequentially onto an optically addressable spatial light modulator (OASLM) arranged in a matrix of segments which forms a complete display. Once all the component images have been written to the OASLM, a complete image or pattern can be presented to an observer, e.g., by illumination of the whole OASLM matrix by laser light. This system is further described in U.S. Pat. No. 6,437,919 and U.S. Pat. No. 6,654,156, the specifications of which are herein incorporated by reference, and which has been referred to as Active Tiling™.

The SLM system may include a layer of liquid crystal material arranged between two electrode-bearing walls to form a liquid crystal cell. The liquid crystal material is switched by application of electric waveforms to the electrodes. A characteristic of liquid crystal materials is that they deteriorate under the effects of long-term DC voltages. The SLM system is designed so that the liquid crystal material is maintained under a net zero DC voltage and so that drive schemes for addressing the SLM system results in DC balance. A net zero voltage may be maintained over a reasonable time period of several seconds.

The EASLM may comprise a liquid crystal cell formed by two walls enclosing a layer of the smectic liquid crystal material. Transparent electrode structures are formed as strips of row electrodes on one wall and strips of column electrodes on the other wall. Electrode intersections define pixels where the optical state of the liquid crystal material is switched by application of an electric voltage to appropriate row and column electrodes. The electrodes receive electrical signals from driver circuits controlled by a display controller. The EASLM may use an integrated circuit backplane. A DC balance is achieved by addressing the SLM system to form a positive image followed by addressing the SLM system to form the inverse or negative image.

An OASLM is similar to the EASLM but may include a layer of photosensitive material located between electrodes on one wall and the ferroelectric liquid crystal material. The electrodes may be segmented so that electrical contact is made separately to each segment. An image may be applied to more than one segment (and in some cases to all of the segments) but a voltage is only applied to one segment to effect latching of the image only at that one segment. The OASLM is addressed by an application of a voltage to the electrodes and a simultaneous application of light to selected parts of the photosensitive material. This combination of applied voltage and applied light causes the liquid crystal material to switch at illuminated parts while non-illuminated parts remain unswitched. A display generated by the SLM system may be viewable from the side of the OASLM that is remote from the photosensitive layer.

Drive schemes may be used to provide DC balance are described further in "Optimization of ferroelectric liquid crystal optically addressed spatial light modulator performance", by F. Perennes & W. A. Crossland, Opt. Eng. 36 (8) 2294-2301 (August 1997); Applied Optics Vol. 31, No. 32, pp. 6859-6868, 10 Nov. 1992. The operating theory of spatial light modulators is described further in "Spatial Light Modulator Technology, Materials, Devices and Applications", edited by U. Efron, published by Marcel Dekker Inc. 1995.

In the SLM system described above, a pattern of light may be transmitted through or reflected from the EASLM, on to each segment of the OASLM in turn. Alternatively, the several images may be applied to all segments of the OASLM. For each time period in which an image is loaded into the EASLM, played onto the OASLM, and latched into the OASLM, there follows an equal time period in which an inverted image is loaded into the EASLM and held in order to maintain DC balance at the EASLM. This time period is wasted from the point of view of the OASLM device. It does not contribute to improving the OASLM image.

BRIEF DESCRIPTION OF THE DRAWINGS

The various embodiments will now be described, by way of example only, with reference to the following drawings in which.

DETAILED DESCRIPTION

Figure 1:
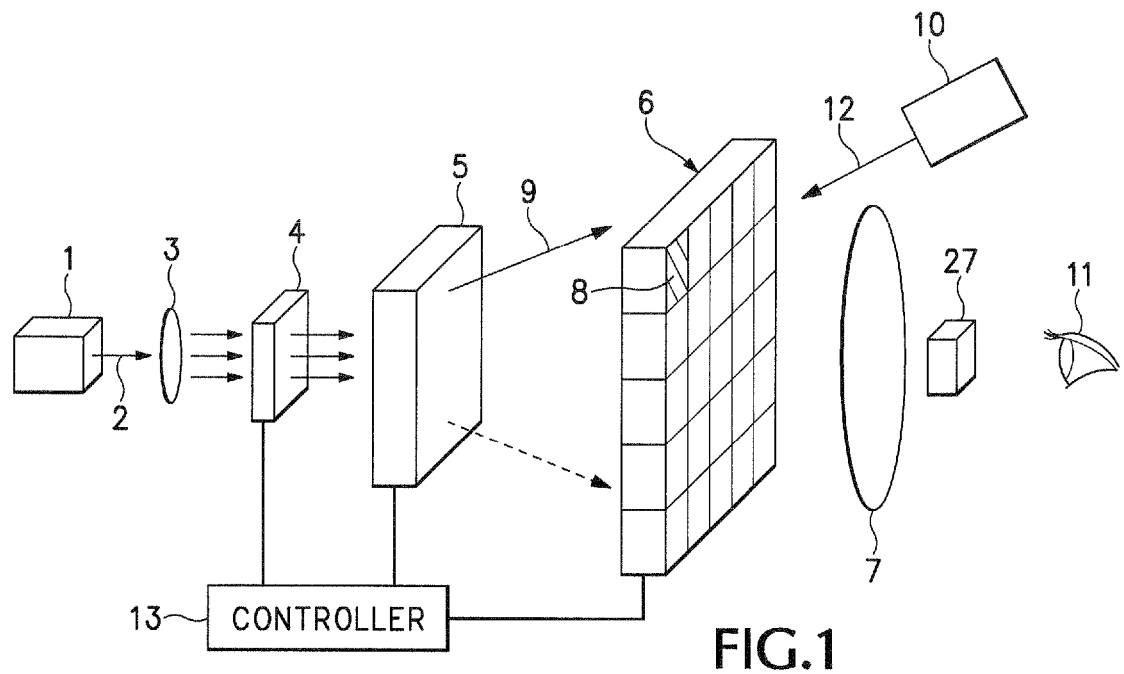
FIG. 1 shows schematically a spatial light modulator (SLM) system having a single electrically addressable spatial light modulator (EASLM) imaged onto an optically addressable spatial light modulator (OASLM)

FIG. 1 shows schematically a spatial light modulator (SLM) system having a single electrically addressable spatial light modulator (EASLM) imaged onto an optically addressable spatial light modulator (OASLM). The SLM system may be used for large area two-dimensional displays, or for three dimensional holographic image displays. A holographic display may also be referred to as a computer generated hologram (CGH).

The SLM system shown in FIG. 1 may be used to generate a reconfigurable holographic display. The SLM system comprises a light source 1 whose output 2 may be directed through a lens 3 onto the EASLM 4. This EASLM 4 may be a liquid crystal modulator in which a layer of smectic liquid crystal material is held between two glass walls. Column electrodes on one wall and row or line electrodes on the other wall form a matrix of addressable elements or pixels at electrode intersections. When a voltage is applied to a pixel, the liquid crystal material rotates under the applied electric field to modulate light transmission. The EASLM may use active matrix addressing to obtain high switching speeds. The EASLM may comprise smectic, nematic, or cholesteric material as well as silicon active backplane devices or micro mirror devices.

In front of the EASLM 4 is an optical arrangement 5, the OASLM 6, and a further lens 7. The OASLM 6 comprises a layer of a smectic liquid crystal material positioned between two glass walls. Both walls carry transparent segment electrodes and one wall carries a layer of photosensitive amorphous silicon. The OASLM 6 comprises multiple separate segments 8, each of which may be independently addressable. Whereas the OASLM 6 is illustrated as comprising twenty five segments arranged in a 5×5 matrix, other size matrixes having different numbers of independently addressable separate segments can be formed.

The optical arrangement 5 may sequentially direct the output of the EASLM 4 to the segments 8, one segment at a time. All of the segments 8 may receive the output in a sequence, for example in a raster manner. When light 9 from the EASLM 4 is incident upon a photosensitive area, a voltage across the liquid crystal layer under that area is modulated thereby modifying its reflective (or transmissive) properties when illuminated by a read-light source 10. A large display formed of many separate sub images can be formed on the OASLM 6. Images may be observed either by reflection of light 12 from, or by transmission of light through, the OASLM 6. The SLM system may be configured such that a pattern of light from the EASLM 4 is transmitted from the OASLM 6 to an observer 11.

In one embodiment, the OASLM 6 may be formed with a single continuous sheet electrode on each cell wall. A shutter may be provided to ensure that light from the EASLM 4 is only received by one segment area of the OASLM 6 at any given time. In another embodiment, the OASLM 6 is formed of several separate optically addressable spatial light modulators placed together to form a large display.

A computer or controller 13 controls the signals applied to the EASLM 4 and OASLM 6. The controller 13 may contain electronic copies of images to be displayed. A further description of EASLMs and OASLMs used with holographic displays is provided in patent application EP-1064651, PCT WO-00/2350472, GB98/04996, the specification of which is herein incorporated by reference.

Figure 2:
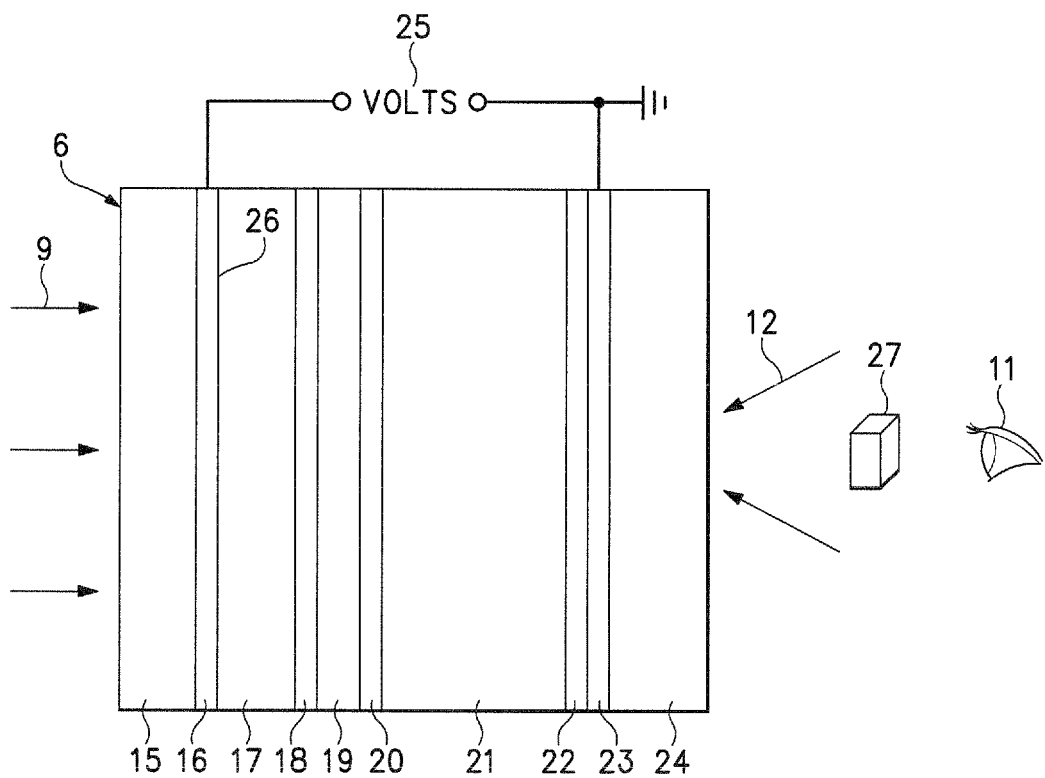
FIG. 2 shows schematically a cross section of the OASLM of the SLM system of FIG. 1.

Particular properties of the OASLM 6 facilitate control of the generation of images. The application of voltages to effect switching in both illuminated and un-illuminated areas of positive and negative images may be used to produce only the positive (or negative) image when both positive and negative images are sequentially applied. FIG. 2 shows schematically a cross section of the OASLM 6 of the SLM system of FIG. 1, illustrating the structure of the OASLM 6. The OASLM 6 comprises a first glass layer 15, an indium tin oxide layer 16 which forms a first transparent electrode, a silicon photosensor layer 17, a light blocking layer 18, a mirror 19, and a first alignment layer 20 which may be formed by brushing a polyimide layer. The OASLM 6 may further comprise a liquid crystal (LC) layer 21, a second alignment layer 22, a second indium tin oxide electrode layer 23 which may be connected to ground, and a second glass layer 24. A voltage source 25 is coupled to the two electrodes 16, 23 in order to control the switching of the OASLM 6.

The junction between the silicon 17 and electrode layer 16 acts as a diode 26. When a voltage of a first positive polarity is applied between the electrodes this diode 26 is forward biased and most of the voltage will be dropped across the LC layer 21. When a voltage of a second, negative polarity is applied to the electrodes, most of the voltage will be dropped across the silicon layer 17 unless write light 9 is applied in which case the voltage will be dropped across the LC layer 21. The bias of the second polarity may be referred to as the "photosensitive direction". When the bias is in the photosensitive direction and with no illumination, the voltage appearing across the LC layer 21, $V_{lc}$, is given by the capacitive division of the total voltage appearing across the OASLM 6. This may be represented as:

$$V_{lc}=C_{si}/(C_{lc}+C_{si}),$$

where $C_{si}$, and $C_{lc}$, are the capacitances of the silicon layer 17 and the LC layer 21, respectively. As charge is generated in the silicon layer 17, the voltage across the LC layer 21 rises.

A Schottky barrier may be formed in the OALSM 6 by a silicon and indium-tin-oxide (ITO) transparent electrode junction, for example the diode 26. This gives behavior some way between that of a photodiode and a photoconductor. If ohmic contacts are made then photoconductor behavior results. In the case of a pure photoconductor, a dark leakage current may occur which is not sufficiently low to keep the voltage from dropping across the LC in a non-illuminated addressed state. On the other hand, a photodiode requires the deposition of p-doped, intrinsic and n-doped Si and is a complicated process. For a photodiode 26 under reverse bias, when a photon is absorbed to produce an electron-hole pair in the silicon, the hole and electron are separated and drift to the contacts. The blocking contacts stop the carriers so that once they are collected the response is complete. The photocurrent varies linearly with the light intensity over a wide range of intensities because one electron-hole pair is collected for each absorbed photon.

With the application of a positive applied voltage, the photodiode is forward biased so that all of the voltage should drop across the LC. The presence of a write light 12 should not affect the state of the LC layer 21 significantly when a positive voltage is applied. When a negative applied voltage is applied, the photodiode 26 is reverse biased and the current is blocked, so that the voltage across the LC layer 21 is unchanged. When a write light 12 illuminates the photodiode 26, a photocurrent charges the LC layer 21 to a negative voltage and causes switching. This voltage is maintained across the LC layer 21 until the drive voltage goes positive again.

For each segment 8, a blanking pulse may be applied to electrodes 16, 23 causing all areas of liquid crystal material 21 to switch to or remain in one of two bistable states, for example an OFF state.

A positive sub-image may be formed on the EASLM 4 and projected onto the OASLM 6. The combination of a light pattern on the input face of the OASLM 6 and the application of a voltage to a segment electrode, causes liquid crystal molecules 21 to switch to an ON state where light is received, elsewhere the molecules remain in an OFF state. The pattern of ON areas and OFF areas forms a diffraction pattern that passes through the Fourier lens 7 to be displayed or seen by all observer 11 as a holographic image 27.

The above operation may be repeated using a negative sub-image generated on the EASLM 4. All areas on the segment may start in the blanked OFF state, wherein areas that receive light switch to the ON state and those not illuminated remain in the OFF state. This forms a diffraction pattern that may be displayed or seen by the observer 11 as the same holographic image 27 received when the previous positive image was projected onto the OASLM 6. Both positive and negative images may provide the same diffraction pattern for observation as a holographic image 27.

Figure 3:
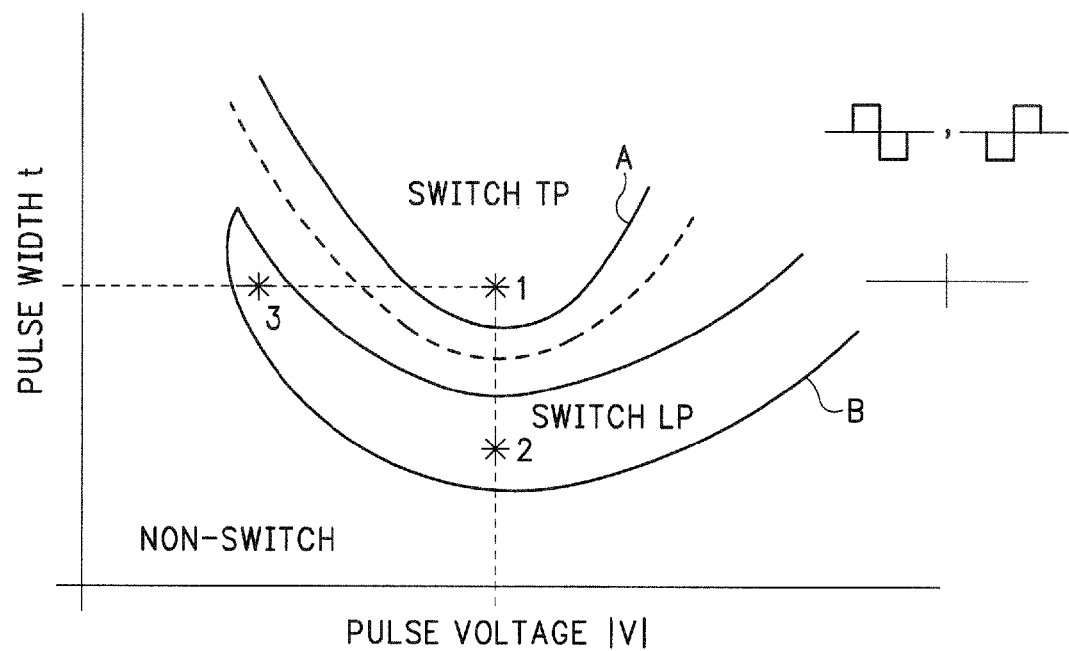
FIG. 3 is a stylized view of switching characteristics for a layer of a bistable ferro-electric liquid crystal device.

FIG. 3 is a stylized view of switching characteristics for a layer of a bistable ferro-electric liquid crystal device. Curve A shows diagrammatically the switching characteristics of a layer of FELCD between electrodes in a bistable cell without a photosensitive layer. This is a logarithmic plot of mono pulse length (t) against pulse (modulus) voltage (|v|). For pulse voltage products (|vt|) above curve A (and in the region enclosed by the curve B) the material will switch between its two allowed stable states, sometimes called the ON and OFF states, or light and dark states, or UP and DOWN states. The material is polarity sensitive, e.g. it will switch from OFF to ON with a suitable positive |vt| product, but remain in the same OFF state on receipt of the same |vt| product but of negative sign. The simplistic curve of FIG. 3 shows complete switching. In practice the curve is more complicated. At |vt| products just below curve A, and above the broken line, the material will partly switch. The broken line indicates the onset of switching.

The curve position and shape depends upon the LC material and its layer thickness and is altered by the shape of the applied voltage pulse. A negative voltage followed by a positive pulse results in a different curve than a small positive followed by a larger positive pulse. Temperature variation introduces further differences into the shape and position of the curve.

Curves A and B apply to application of bipolar pulses. Curve A applies when the material switches to the trailing pulse in a pulse pair of opposite polarity, i.e. a positive followed by a negative voltage pulse and vice versa. Curve B applies to some material and thickness combinations in which the material switches on the leading pulse but not the trailing pulse of a bipolar pulse pair. The curves A and B are schematic and for illustrative purposes only. They show that it is possible to address a display to either of its two states, ON and OFF, using either a leading or a trailing pulse in a bipolar pulse pair. For example FIG. 3 shows three vt product combinations indicated by *1, *2, *3, where one pair (*1, *2) allow switching at the same voltage but to the leading pulse at one pulse width (*2) or to the trailing pulse at another pulse width (*1). The other pair (*1, *3) allow switching at the same pulse width but to the leading pulse at one voltage (*3) or to the trailing pulse at another voltage (*1).

Curves A and B may be further modified by the presence of a photosensitive layer, the effects of the diode 26, and the presence or absence of light. A positive voltage applied to electrode 16 adjacent the photoconductor results in different curves to that obtained when a negative voltage is applied to electrode 16. Furthermore, the presence or absence of light results in different curves to both the positive and negative voltage curves noted immediately above.

These differences in switching characteristics may be used to switch the same display pattern on the OASLM 6 when illuminated by a positive image from the EASLM 4 and a negative image from the EASLM 4.

Example switching combinations are provided below:

| | Bias | | | | | | | |
|---|---|---|---|---|---|---|---|---|
| | +ve | +ve | +ve | +ve | −ve | −ve | −ve | −ve |
| Illuminate Dark/N1 | I | I | NI | NI | I | I | NI | NI |
| Switches on | LP | TP | LP | TP | LP | TP | LP | TP |

Where Bias is positive (+ve) or negative (−ve) voltage applied to electrode 12, illuminate (I) or non-illuminate (NI), e.g. dark, is light from EASLM imaged on to the OASLM 6, and material switches on either a leading pulse (LP) or a trailing pulse (TP) of a bipolar addressing waveform.

Switching characteristics are shown in FIGS. 4-9 for an OASLM formed by a 1.7 μm thick layer of a ferro-electric smectic liquid crystal material 50:50 mixture of chiral SCE8 and its racemic equivalent SCE8R (obtainable from CLARIANT, GmbH), in a cell with DI-32 rubbed polymer (DURIMIDE 32 obtainable from ARCH SEMICONDUCTOR CHEMICALS NV Belgium) alignment, with a photo sensitive layer of MVS (MV Systems Inc., Golden, Denver, Colo.) silicon ~1.5 μm thick.

Figure 4:
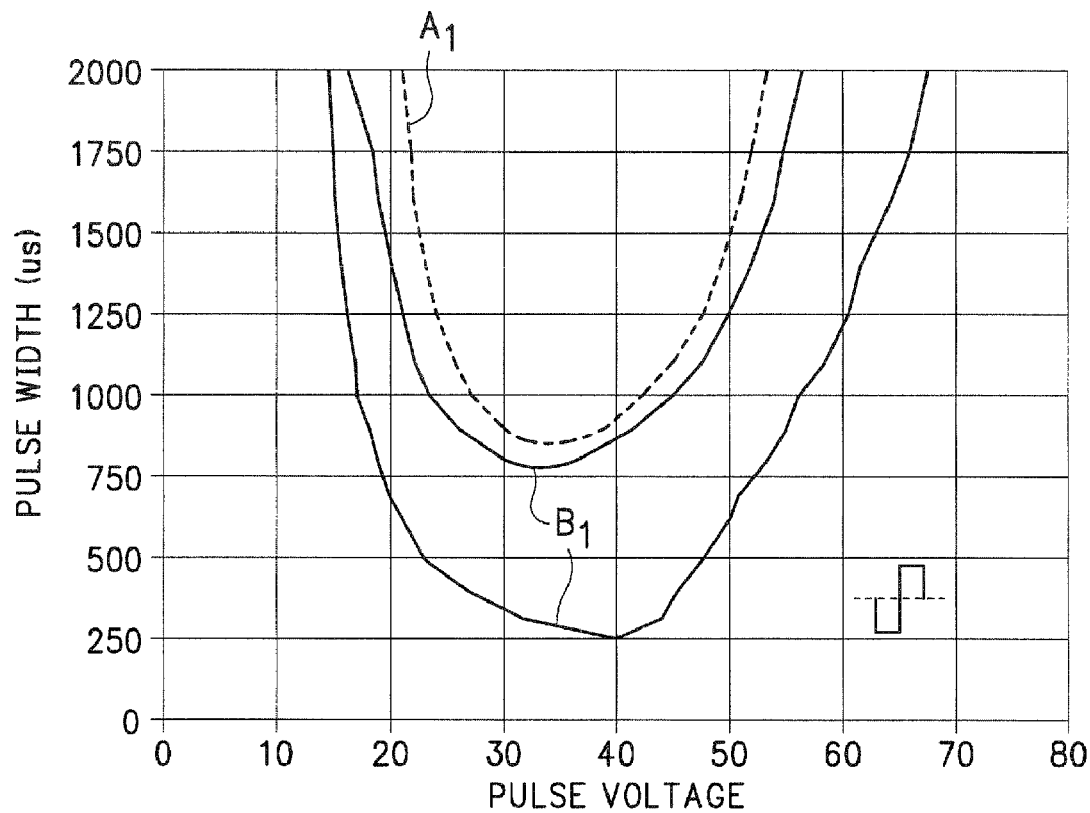
FIG. 4 shows the switching characteristics of an OASLM when addressed by a bipolar waveform of a negative pulse followed by a positive pulse without any illumination.

FIG. 4 shows the switching characteristics of an OASLM when addressed by a bipolar waveform of a negative pulse followed by a positive pulse without any illumination. Switching curve A1 shows switching on the trailing pulse. Switching curve B1 shows switching on the leading pulse of a bipolar pulse pair formed by a negative then a positive pulse.

Figure 5:
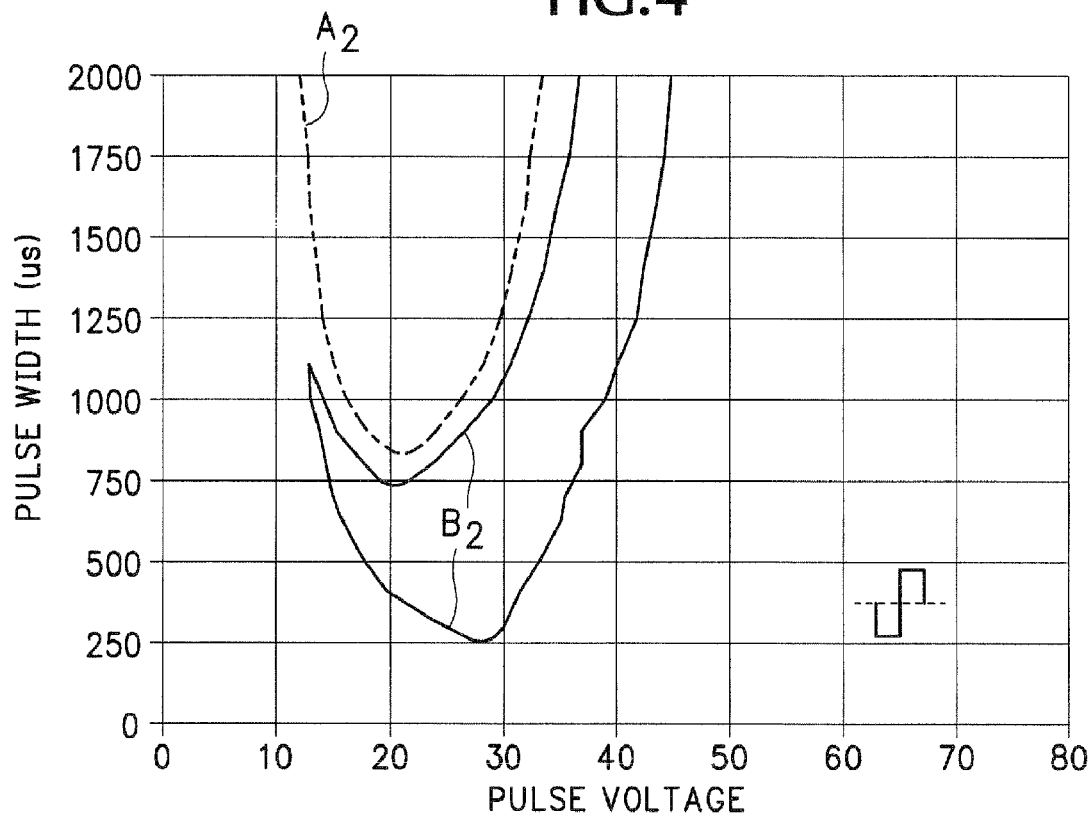
FIG. 5 shows the switching characteristics of an OASLM when addressed by a bipolar waveform of a negative pulse followed by a positive pulse with illumination.

FIG. 5 shows the switching characteristics of an OASLM when addressed by a bipolar waveform of a negative pulse followed by a positive pulse with illumination. Switching curve A2 shows switching on the trailing pulse. Switching curve B2 shows switching on the leading pulse of a bipolar pulse pair formed by a negative then a positive pulse.

Figure 6:
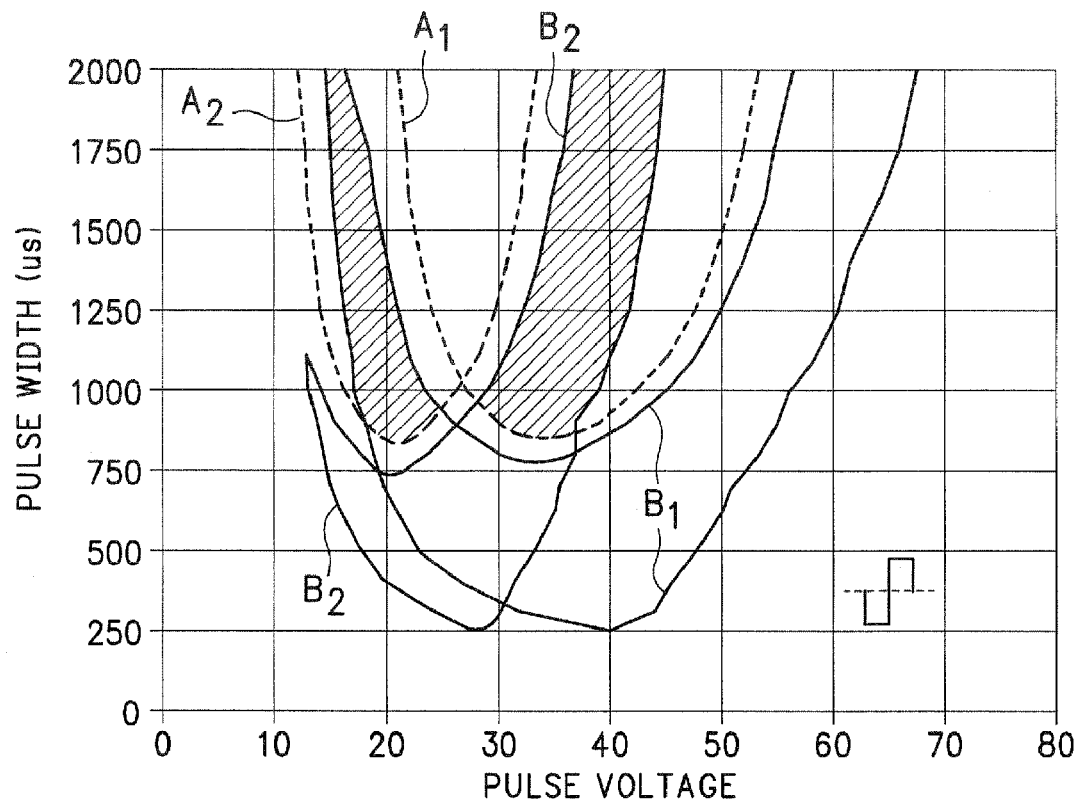
FIG. 6 shows the switching characteristics of FIGS. 4 and 5 on a single graph.

FIG. 6 shows the switching characteristics of FIGS. 4 and 5 on a single graph. Hatched areas indicate where the material will switch to both parts of a bipolar pulse formed by first a negative leading pulse then a positive trailing pulse, one part illuminated, one part un-illuminated.

Figure 7:
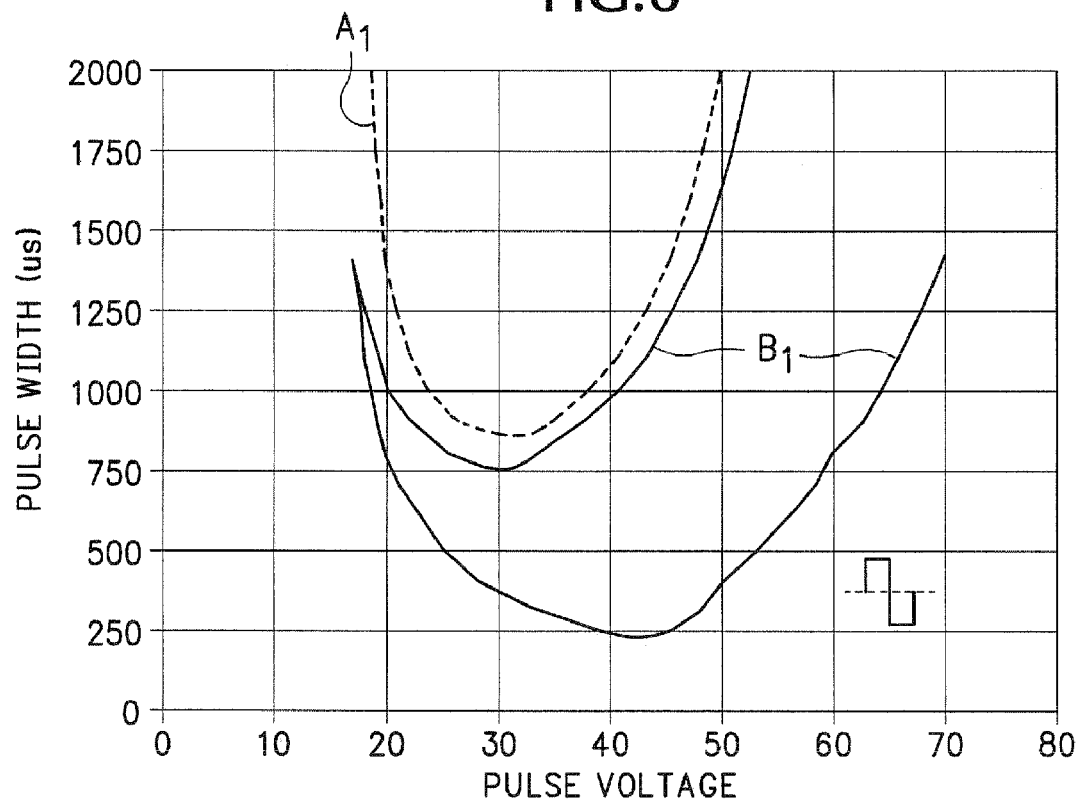
FIG. 7 shows the switching characteristics of an OASLM when addressed by a bipolar waveform of a positive pulse followed by a negative pulse without any illumination.

FIG. 7 shows the switching characteristics of an OASLM when addressed by a bipolar waveform of a positive pulse followed by a negative pulse without any illumination. Switching curve A1 shows switching on the trailing pulse. Switching curve B1 shows switching on the leading pulse of a bipolar pulse pair formed by a positive then a negative pulse.

Figure 8:
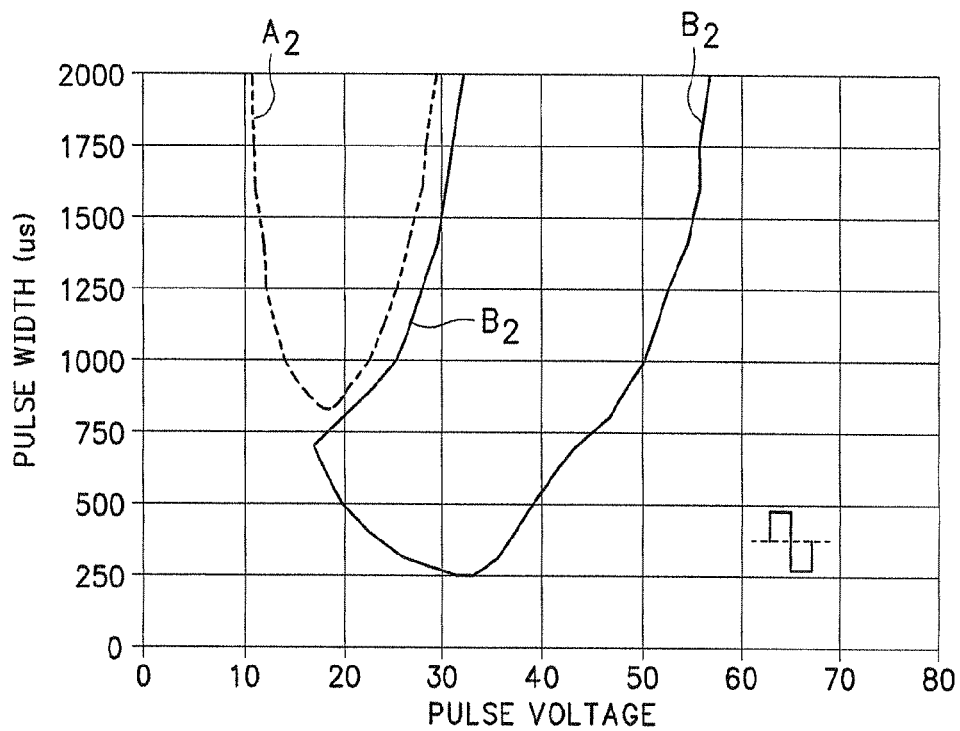
FIG. 8 shows the switching characteristics of an OASLM when addressed by a bipolar waveform of a positive pulse followed by a negative pulse with illumination.

FIG. 8 shows the switching characteristics of an OASLM when addressed by a bipolar waveform of a positive pulse followed by a negative pulse with illumination. Switching curve A2 shows switching on the trailing pulse. Switching curve B2 shows switching on the leading pulse of a bipolar pulse pair formed by a positive then a negative pulse.

Figure 9:
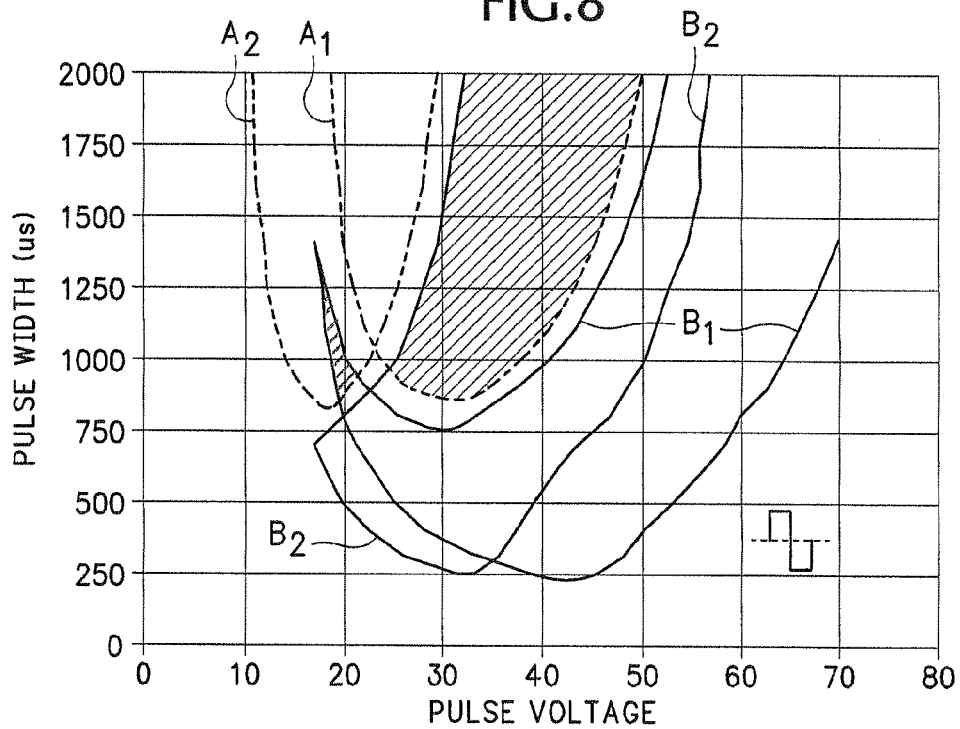
FIG. 9 shows the switching characteristics of FIGS. 7 and 8 on a single graph.

FIG. 9 shows the switching characteristics of FIGS. 7 and 8 on a single graph. Hatched areas indicate where the material will switch to both parts of a bipolar pulse formed by first a positive voltage pulse then a negative pulse, one part illuminated, one part un-illuminated.

Figure 10:
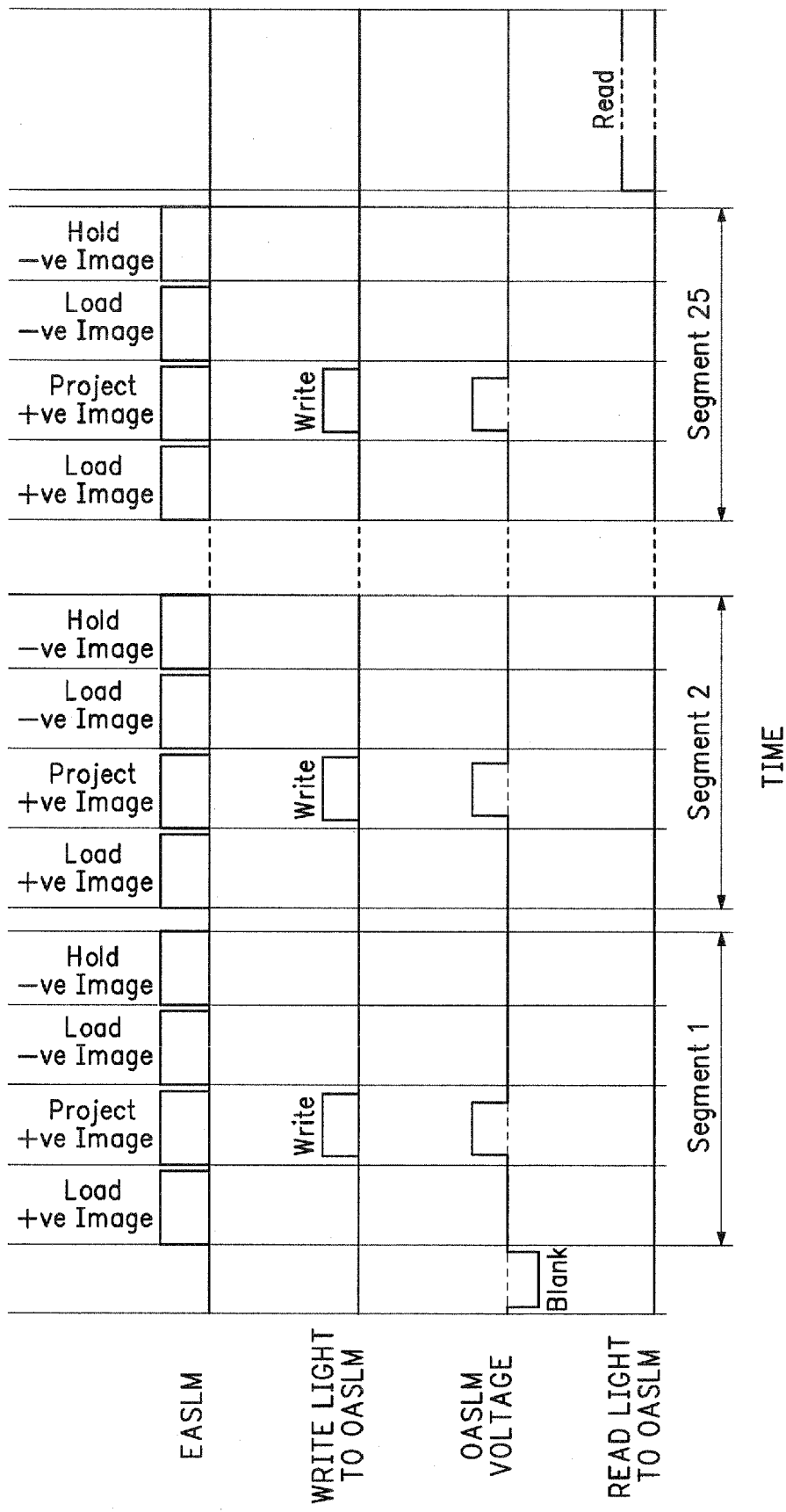
FIG. 10 is a pictorial representation illustrating an addressing operation of an SLM system.

FIG. 10 is a pictorial representation illustrating an addressing operation of an SLM system, such as the SLM system of FIG. 1. Associated activity at an EASLM, an OASLM and a read light is plotted against time, corresponding with a first segment S1, second segment, and an nth segment S25. The number of segments (n) corresponds to the number of segments in an OASLM matrix, which in one example is illustrated by a five by five matrix comprising 25 segments.

At the start of an addressing operation, the EASLM is addressed to load a positive image to be associated with the first segment S1. The positive image is projected on to segment S1 of the OASLM at the same time that a voltage is applied to the OASLM, so that the positive sub image is latched into the liquid crystal material. Next a negative image for S1 is loaded into the EASLM, but not read onto the OASLM, and without applying a voltage to the OASLM.

These steps may be repeated until all segments of the OASLM have been addressed and a complete image is formed in the OASLM. The read light may be applied for a suitable time period, or frame rate, so that a complete image is displayed or otherwise formed. The time period may correspond to an ability of the human eye to recognize or register the complete image. The read light is then switched off and the process repeated if a different complete image is to be displayed, for example if the repeating images are displayed in rapid succession to produce an effect of continuous motion.

To obtain DC balance at the OASLM, a blanking voltage may be applied before the star of addressing. This blanking pulse may be arranged both to provide blanking and DC balance. Additionally, extra voltage periods may be introduced.

From the FIG. 10 it is clear that there are significant time periods when no information is being written into the OASLM. This may reduce efficiency because less than half of the EASLM addressing time can be used by the OASLM to form an image. For example, the total time taken by EASLM in being addressed and holding an image is about 300 to 1000 μs. The time used by the OASLM in being addressed is about 50 to 5000 μs, and the time used by the read light illumination is about 30 ms.

Figure 11:
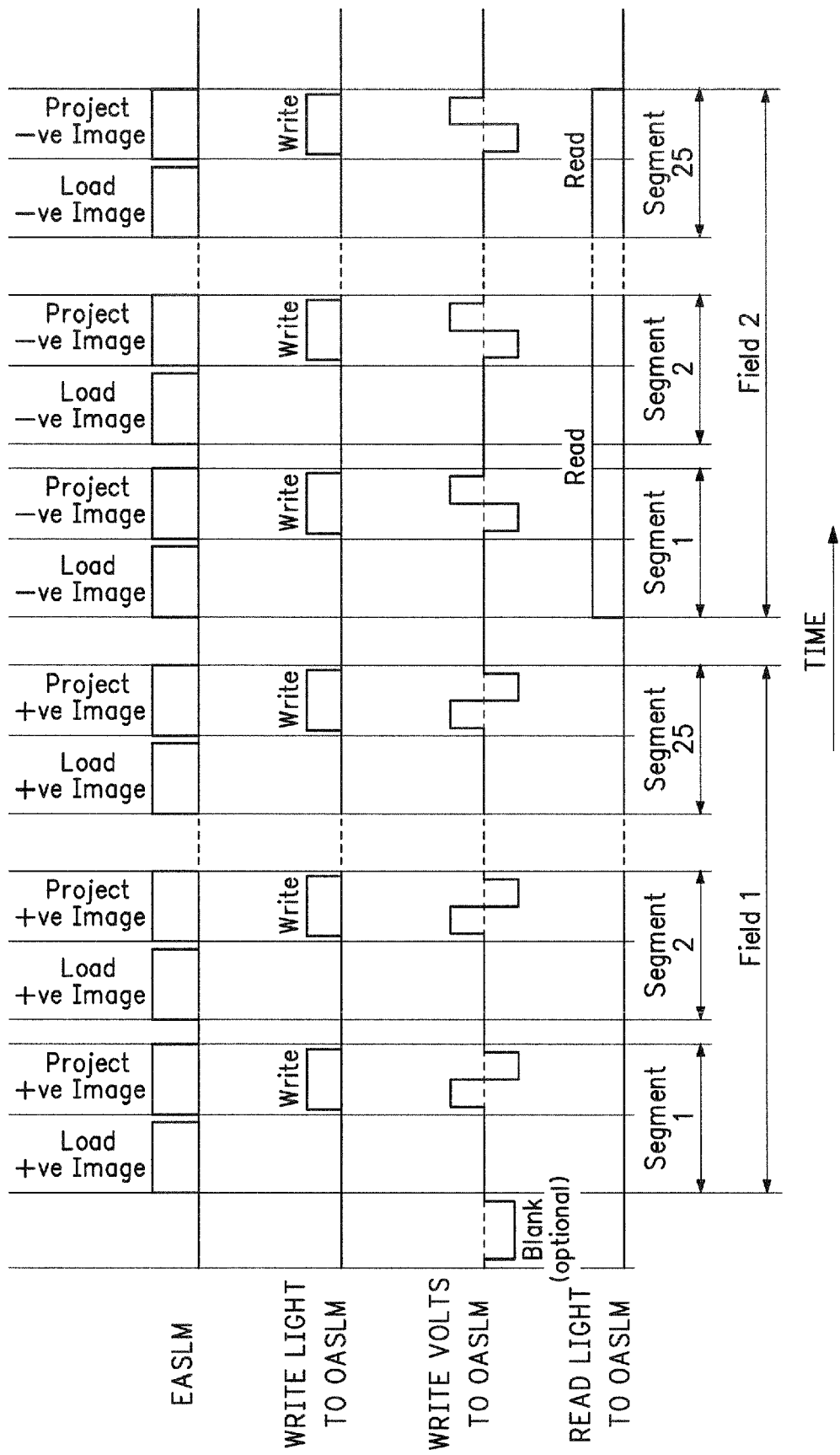
FIGS. 11 to 13 are pictorial representations of three novel methods of addressing in an SLM system.
Figure 12:
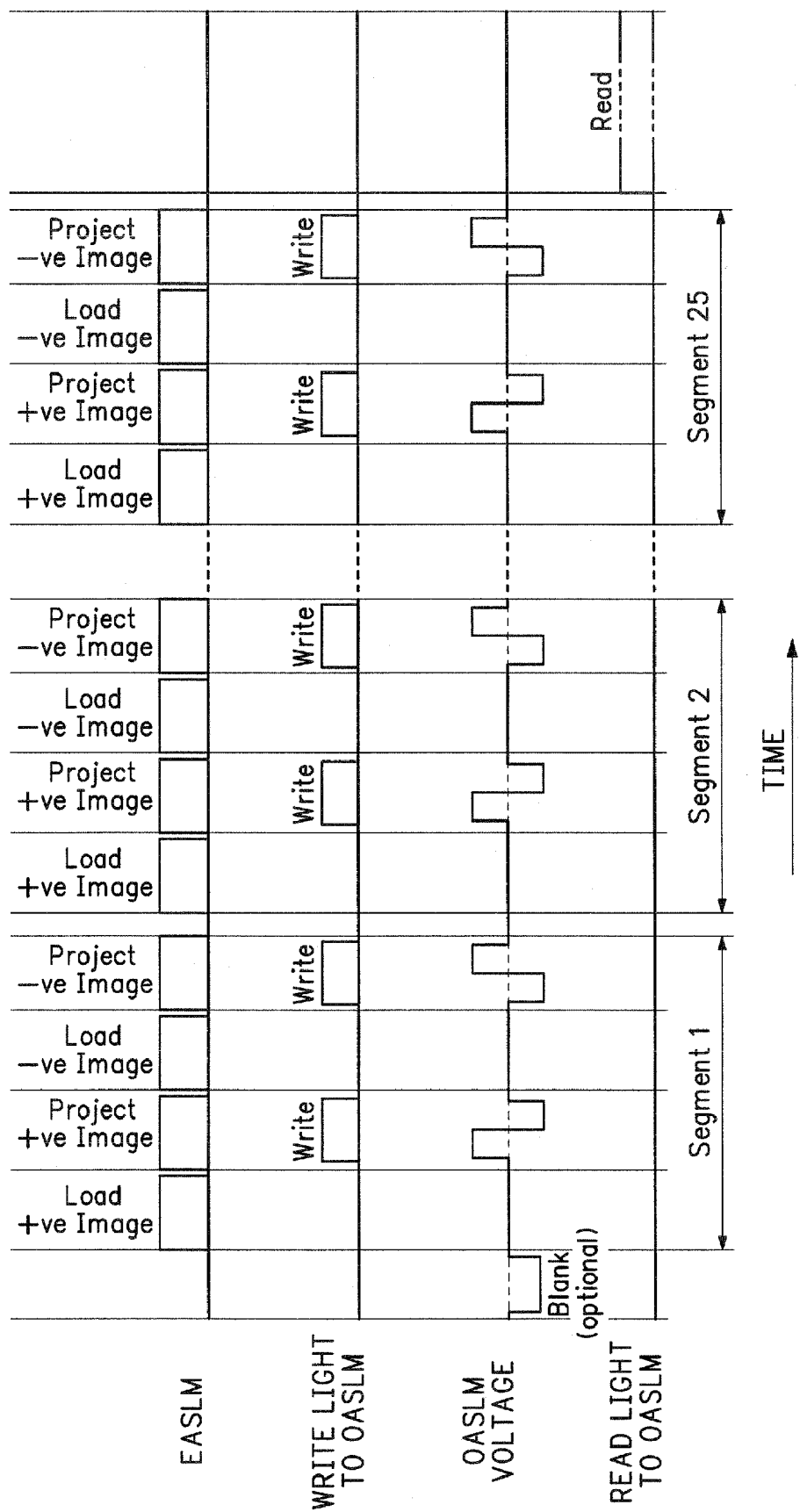
Figure 13:
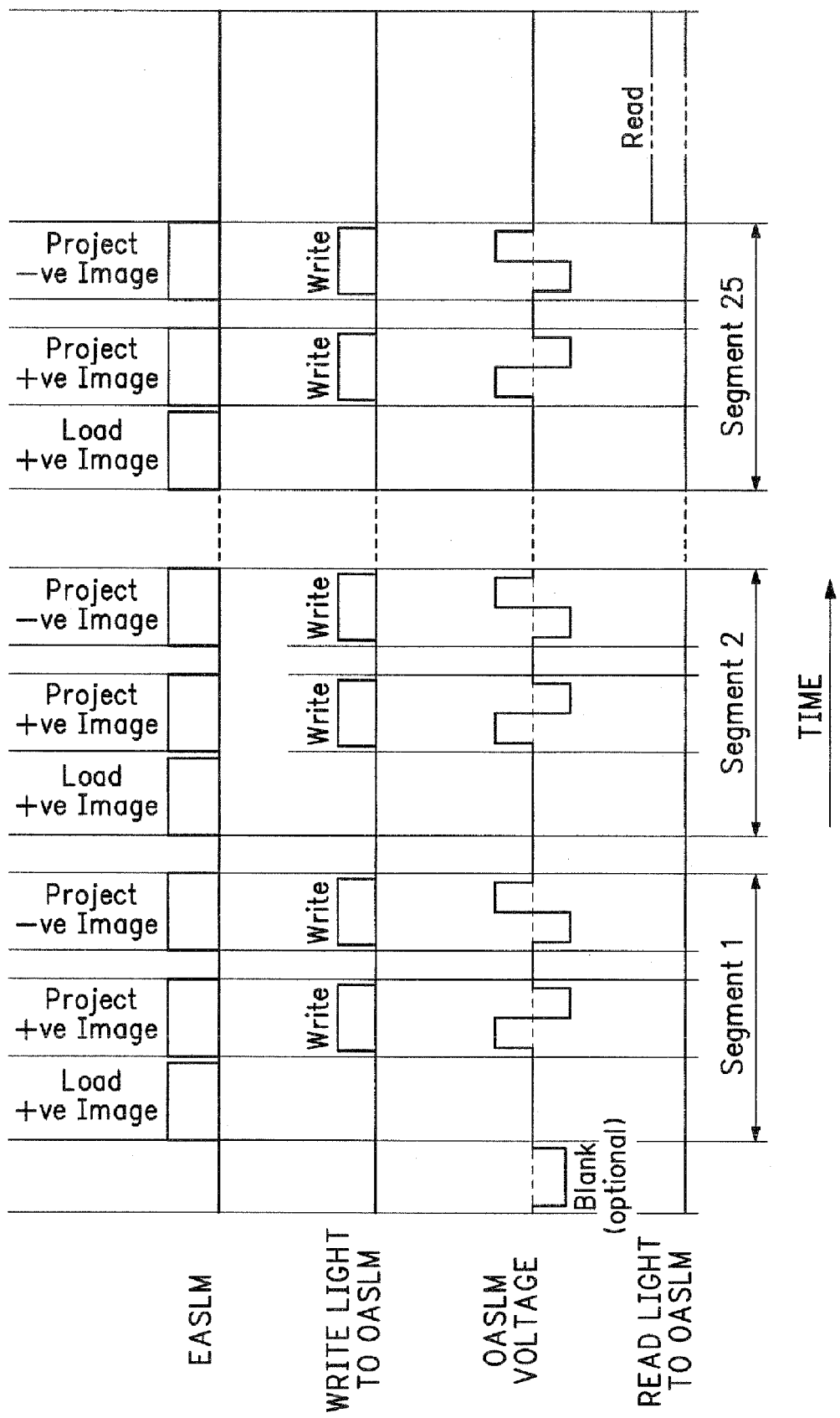

FIGS. 11 to 13 are pictorial representations of three novel methods of addressing in an SLM system. The first method of operating an SLM system, such as the SLM system of FIG. 1, is illustrated in FIG. 11. The EASLM 4 is addressed under the control of the computer 13 to form a positive sub-image of a part of a larger image. This sub-image is projected (e.g. as write light to the OASLM 6) via the optical arrangement 5 onto the silicon layer 17 at one of the segments 8 (e.g. first segment S1) forming the OASLM 6. At the same time a first bipolar addressing pulse pair is applied to the OASLM electrode 16. As a result the ferro-electric material 21 in that segment 8 (e.g. first segment S1) is switched into a replica of the positive image on the EASLM 4.

This process may be repeated until all segments 8 (e.g. the first segment S1 to the nth segment S25) of the OASLM 6 have been addressed with a positive image that can be displayed, or viewed by the observer 11, when the read light 12 is applied. The time taken to address the whole OASLM 6 with a positive image may be termed a first field time, analogous to matrix addressed FELCD's. This positive image remains due to the bistable switching properties of the ferro-electric material. In one embodiment, a blanking pulse may be applied to the OASLM 6 before the segment 1 is addressed with a positive image.

In one embodiment, the above addressing operation is repeated, but with the EASLM 4 addressed to form the inverse, that is, forming negative sub-images of the positive sub-images. When each segment 8 is being illuminated, a second bipolar addressing pulse pair may be applied to the electrode 16. The time taken to address the whole OASLM 6 with a negative image may be termed a second field time. During this second field time, the read light 12 may continue to be applied.

In one embodiment, the read light may be applied for a short time after all n segments of the OASLM 6 have been addressed with a positive image. Then all n segments of the OASLM 6 may be addressed with a negative image, and the read light applied for a short time.

Figure 14:
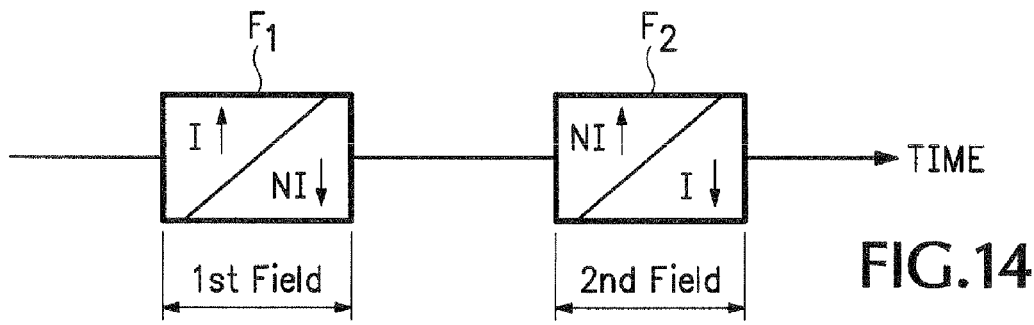
FIG. 14 is a pictorial representation of the addressing of a single segment of the OASLM in which a positive image followed by a negative image is received by the OASLM.

FIG. 14 is a pictorial representation of the addressing of a single segment 8 of the OASLM 6 in which a positive image followed by a negative image is received by the OASLM 6. The first field addressing F1, associated with a positive image from the EASLM 4, is shown by a rectangle indicating that illuminated regions (I) on the OASLM segment 8 are switched to an UP state and non illuminated regions (NI) are switched to a DOWN state. This may be repeated for the remaining n−1 (e.g. twenty-four) segments. A short time later, inverse switching may be applied to the second field F2, associated with the negative image. In this second field F2 the non-illuminated regions are switched to the UP state and the illuminated regions are switched to the DOWN state.

Both positive and negative sub-images may be projected onto the OASLM so that about double the time is spent loading images into the OASLM. Additionally, when all positive images have been loaded into the OASLM 6, the read light 12 may be switched on for the whole of the negative addressing time in the second field F2 and may continue for some time afterwards. This allows a faster addressing time, useful when providing frame sequential color displays.

A second method of operating an SLM system, such as the SLM system of FIG. 1, is illustrated in FIG. 12. The EASLM 4 is addressed under the control of the computer 13 to form a positive sub-image of a part of a larger image. This sub-image is projected (e.g. as write light to the OASLM 6) via the optical arrangement 5 onto the silicon layer 17 at one of the segments 8 (e.g. segment S1) forming the OASLM 6. At the same time a first bipolar addressing pulse pair is applied to the OASLM electrode 16. As a result the ferro-electric material 21 in that segment 8 (e.g. segment S1) is switched into a replica of the positive image on the EASLM 4. The computer 13 is configured to control the EASLM 4 to form a negative sub-image (−S1) and this is projected onto the segment S1 of the OASLM 6 at the same time that a second bipolar addressing pulse pair is applied to the OASLM electrode 16. As a result the ferro-electric material reinforces the image formed by the previous positive sub-image from the EASLM 4.

In one embodiment, a blanking pulse may be applied to the OASLM 6 before any segment is addressed with a positive image. This blanking pulse may be unipolar as shown or bipolar and arranged to give DC balance. Furthermore, with segmented OASLMs, a blanking pulse may be applied to each segment before each segment is addressed.

This process of projecting alternate positive and negative images onto the OASLM 6 may be repeated for each segment S1 to S25 in turn. The read light 12 may then be applied and the single positive image displayed to an observer 11.

In a modification of the embodiment illustrated by FIG. 12, the system may operate with either positive or negative images for some periods of time rather than both positive and negative images as shown. The read light 12 may be applied continuously, or all the time except when images are being written. In another embodiment, the system may operate using only one part of the bipolar pulses in a two-field mode. For example, the illuminated areas may be switched on for the −ve trailing pulse in the +ve image, and the illuminated areas may be switched on for the +ve trailing pulse in the −ve image. The illuminated areas may be switched on with or without the readout light during this addressing cycle.

Another method of operating an SLM system, such as the SLM system of FIG. 1, is illustrated in FIG. 13. This method uses an EASLM, which loads and stores both positive and negative images together. The method is similar as that illustrated in FIG. 12, except that the time taken to load a –ve image into the EASLM has been eliminated. For each segment 8 a positive image may be projected while a first bipolar pulse is being applied to the OASLM 6, closely followed by projecting a negative image together with a second bipolar pulse pair to the OASLM 6.

In one embodiment, a blanking pulse may be applied to the OASLM 6 before any segment 8 is addressed with a positive image. This blanking pulse may be unipolar as shown or bipolar and arranged to give DC balance. Furthermore, with segmented OASLMs, a blanking pulse may be applied to each segment before each segment is addressed.

For a stationary display, the complete image can be left on the OASLM 6 until a different image is displayed. For video type displays, a new and different complete image may be displayed at a frame rate of every 30 ms or so. The above process is then repeated for each new complete image to be displayed as part of a moving display. Alternatively, the system may operate in a two-field mode as for FIG. 12.

Figure 15:
FIGS. 15 to 17 are three examples of waveforms for application to electrodes on the OASLM.
Figure 16:
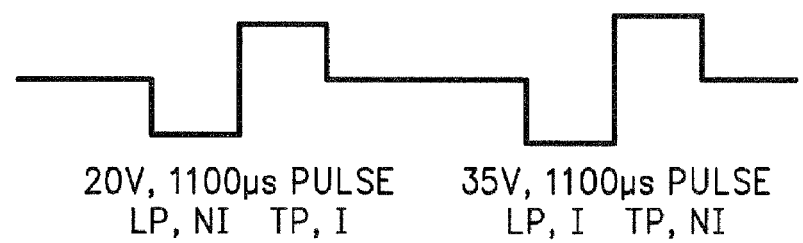
Figure 17:
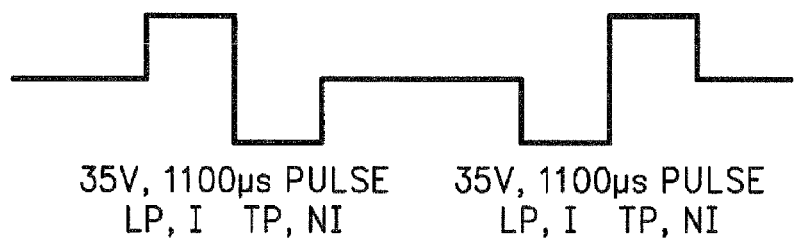

FIGS. 15 to 17 are three examples of waveforms for application to electrodes on an OASLM. A positive image may be displayed where both a positive image and an identical but negative image are written onto the OASLM. Timings shown in the figures may be understood as corresponding to the pictorial view of FIG. 14.

In the first example illustrated by FIG. 15, a first pulse pair comprising a positive 35 v pulse followed by a negative 35 v pulse, with a pulse width of 1250µ seconds during the first field F1. With further reference to FIG. 9, it may be understood that the hatched area between curves B2, A1 shows that:

(1) the positive 35 v pulse at 1250 µs gives switching to UP in the leading pulse for illuminated regions of the OASLM, and (2) the negative 35 v pulse gives a switching to DOWN in the trailing pulse for non-illuminated regions.

In the second field F2 the bipolar pulses comprise a positive 19 v pulse followed by a negative 19 v pulse with a period of 1100 µs. From the left hand hatched area enclosed between curves A2, B1 the leading pulse switches non-illuminated regions to UP, and the trailing pulse switches illuminated regions to DOWN.

In a second example illustrated by FIG. 16 the first pulse pair comprises a negative 20 v pulse followed by a positive 20 v pulse, with a period of 1100 µseconds during the first field F2. With further reference to FIG. 6, it may be understood that the left hand hatched area between curves A2, B1 shows that:

(1) the negative 20 v pulse at 1100 ps gives switching to DOWN in the leading pulse for non-illuminated regions of the OASLM, and (2) the positive 20 v pulse gives a switching to UP in the trailing pulse for illuminated regions.

In the second field F2 the bipolar pulses comprise a negative 35 v pulse followed by a positive 35 v pulse with a period of 1100 µs. From the right hand hatched area between curves A2, B1 the leading pulse switches illuminated regions to DOWN, and from curve A1 the trailing pulse switches non-illuminated regions to UP.

In a third example illustrated by FIG. 17, the first pulse pair is a positive 35 v pulse followed by a negative 35 v pulse, with a period of 1100 µseconds during the first field time F1. With further reference to FIG. 9, it may be understood that the right hand hatched area between curves A1, B2 shows that:

(1) the positive 35 v pulse at 1100 ps gives switching to UP in the leading pulse for illuminated regions of the OASLM, and (2) the negative 35 v pulse gives a switching to DOWN in the trailing pulse for non-illuminated regions.

In the second field F2 the bipolar pulses comprise a negative 35 v pulse followed by a positive 35 v pulse, with a period of 1100 µs. With further reference to FIG. 6 it may be understood that the right hand hatched area between curves A1, B2 shows that the leading pulse switches illuminated regions to DOWN, and the trailing pulse switches non-illuminated regions to UP.

The above three examples illustrated by FIGS. 15-17 show that the OASLM 6 may be addressed by bipolar pulse pairs to display a positive image for both positive and negative images generated by the EASLM 4. No blanking pulses need to be used for these three examples. However, in one embodiment a blanking pulse is applied before the addressing cycle. The blanking pulse may be a DC balanced bipolar pulse of positive and negative polarity of sufficient amplitude and time period to switch the ferro-electric material to the desired uniform state. Use of blanking pulses allows the addressing bipolar pulses to be of unequal amplitude and/or widths and still maintain DC balance.

As previously mentioned, for some SLM systems, after each time period in which an image is loaded into the EASLM, played onto the OASLM and latched into the OASLM, there may follow an equal time period in which an inverted image is loaded into the EASLM and held in order to maintain DC balance at the EASLM. Improved efficiencies may be obtained by addressing the EASLM with both positive and negative images or patterns, for example to give DC balance. Both positive and negative images may be imaged onto an input face of one or more OASLMs while addressing the OASLM with two different bipolar addressing pulses of such amplitude and duration that the same image appears on the OASLM output for both a positive and negative input image.

In one embodiment, a spatial light modulator system comprises an EASLM. The system may be arranged to receive light from a source, and include a means for transmitting the light onto an OASLM from which a display may be formed. The system may further include means for addressing the EASLM with both positive and negative images to obtain DC balance in the EASLM.

In one embodiment, a controller is configured for controlling an image on the EASLM and for controlling voltages on the OASLM. The system may include means for applying a first bipolar voltage pulse to the OASLM associated with reception of positive images from the EASLM and means for applying a second and different bipolar voltage pulse to the OASLM associated with reception of negative images from the EASLM. The OASLM may have an output of a required image and substantial DC balance.

In one embodiment, the image may be displayed or observed by reflecting an ambient light from the OASLM or by reflecting an illuminating light or read light directed onto the OASLM. The illuminating light may be transmitted from a broadband source or a laser. In the latter case a holographic display may be formed. A Fourier transform lens may be arranged between the OASLM and an observer.

The OASLM may be a single large cell with segmented electrodes whereby a voltage may be applied independently to any one area of the liquid crystal material between opposing segment electrodes. The light directing means may include shutters and lenses for directing sub images from the EASLM separately to each segment of the OASLM in a sequence.

In one embodiment, alternative positive and negative images are written on to each segment in turn until all the OASLM has been addressed, and then a read light applied. In another embodiment, all the positive sub images may be imaged onto all segments of the OASLM to form a complete image, and the read light is continuously applied while all negative sub images are generated by the EASLM and applied to the OASLM.

Figure 18:
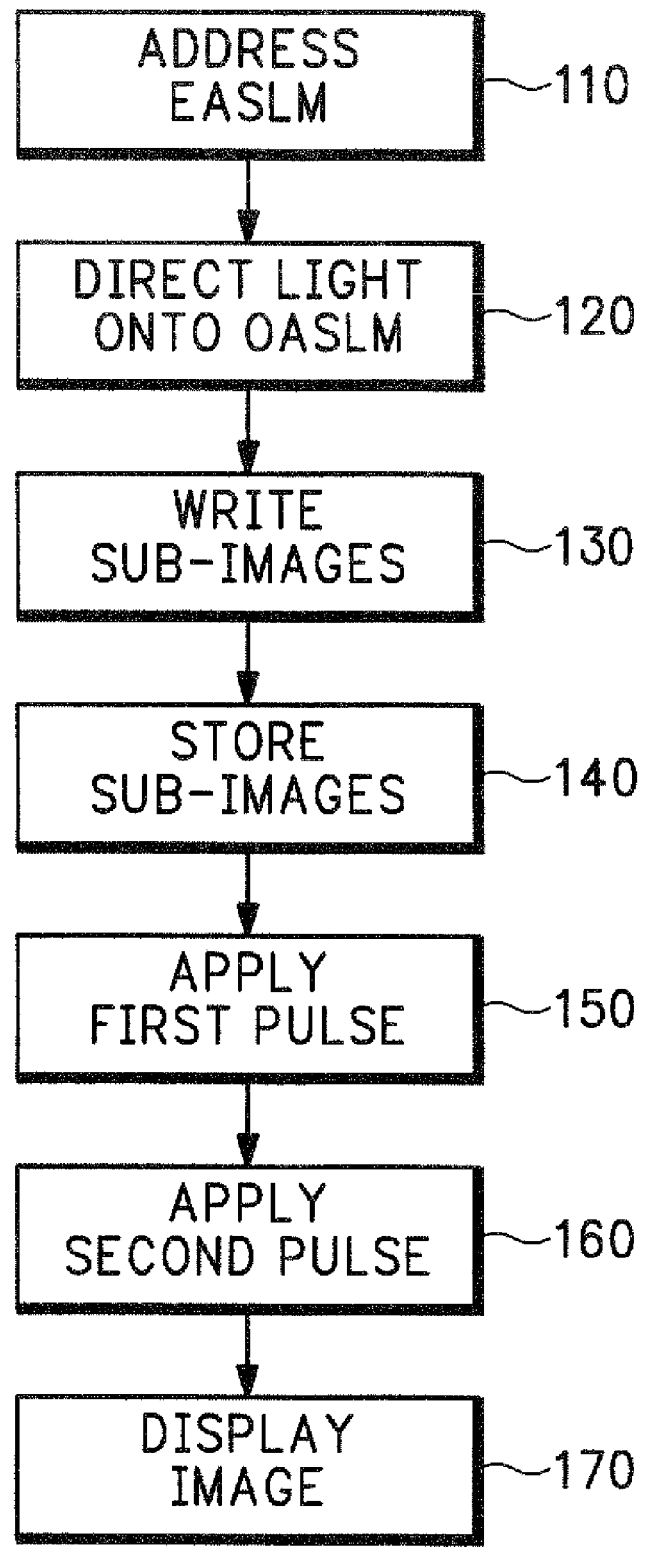
FIG. 18 illustrates an example method of addressing an SLM system.

FIG. 18 illustrates an example method of addressing an SLM system. At operation 110, an EASLM is addressed to form a succession of both positive and negative sub images.

At operation 120, light is directed from the EASLM onto an OASLM.

At operation 130, sub-images are written onto different areas of the OASLM.

At operation 140, a plurality of sub-images are stored on the OASLM to form a complete image.

At operation 150, a first bipolar voltage pulse is applied to the OASLM associated with reception of positive sub-images from the EASLM.

At operation 160, a second and different bipolar voltage pulse is applied to the OASLM associated with reception of negative sub-images from the EASLM.

At operation 170, a complete image is displayed, wherein the shapes of the first and second bipolar pulses are arranged so that the OASLM displays the same image for inputs of both positive and negative sub-images.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles in a preferred embodiment thereof, it should be apparent that the embodiments may be modified in arrangement and detail without departing from such principles. We claim all modifications and variation coming within the spirit and scope of the following claims.

The invention claimed is:

1. A spatial light modulator system comprising:
   an optically addressable spatial light modulator (OASLM);
   an electrically addressable spatial light modulator (EASLM) arranged to transmit light onto the OASLM; and
   one or more controllers configured to;
   alternately address the EASLM with a positive image and a negative image;
   write the positive image to the OASLM;
   apply a first bipolar voltage pulse to the OASLM while writing the positive image,
   write the negative image to the OASLM; and
   apply a second bipolar voltage pulse to the OASLM while writing the negative image.

2. The system of claim 1 wherein the OASLM comprises a plurality of separate OASLM segments arranged in a matrix format to form a single display unit.

3. The system of claim 2 wherein the positive and negative images are received by each OASLM segment in a sequence, one segment at a time.

4. The system of claim 1 further comprising a write light which is applied to the OASLM to at least partially coincide with both the first bipolar voltage pulse and the second bipolar voltage pulse.

5. The system of claim 1 further comprising a read light directed towards the OASLM to display a complete image, wherein the complete image comprises both the positive and negative images.

6. The system of claim 5 wherein the complete image is a human readable two-dimensional image.

7. The system of claim 5 wherein the complete image displayed by the OASLM comprises a diffraction pattern associated with a three dimensional image.

8. The system of claim 1 wherein the positive and negative images are loaded onto the EASLM at the same time.

9. The system of claim 1 wherein the first and second bipolar voltage pulses have unequal widths.

10. A method comprising:
    addressing an electrically addressable spatial light modulator (EASLM) to form a succession of both positive and negative sub-images;
    writing the positive and negative sub-images onto an optically addressable spatial light modulator (OASLM);
    storing a plurality of the positive and negative sub-images on the OASLM;
    applying a first bipolar voltage pulse to the OASLM associated with the positive sub-images, wherein application of the first bipolar voltage pulse at least partially overlaps the writing of the positive sub-images; and
    applying a second and different bipolar voltage pulse to the OASLM associated with the negative sub-images, wherein application of the second bipolar voltage pulse at least partially overlaps the writing of the negative sub-images, and wherein the OASLM is configured to display a positive image comprising inputs from the positive and negative sub-images.

11. The method of claim 10 wherein writing the positive and negative sub-images comprises
    writing the negative sub-images onto the OASLM after the positive sub-images have been written.

12. The method of claim 11 further comprising:
    applying a read light to the OASLM during the writing of the negative sub-images.

13. The method of claim 10 wherein writing the positive and negative sub-images comprises
    writing both the positive and negative sub-images onto a plurality of segments of the OASLM.

14. The method of claim 13 wherein the positive and negative sub-images are alternately written onto the segments of the OASLM.

15. The method of claim 10 wherein the first and second bipolar pulses are alternately applied to the OASLM.

16. The method of claim 10 wherein the second bipolar pulse comprises a negative leading pulse and a positive trailing pulse.

17. The method of claim 10 wherein the first bipolar pulse comprises a positive leading pulse and the second bipolar pulse comprises a negative leading pulse.

18. An apparatus comprising:
means for addressing an electrically addressable spatial light modulator (EASLM) with a positive sub-image and a negative sub-image;
means for writing the positive and negative sub-images onto an optically addressable spatial light modulator (OASLM);
means for storing a plurality of the positive and negative sub-images on the OASLM;
means for applying a first bipolar voltage pulse to the OASLM associated with the positive sub-image;
means for applying a second bipolar voltage pulse to the OASLM associated with the negative sub-image; and
means for displaying a complete image comprising the positive and negative sub-images.

19. The apparatus of claim 18 wherein the positive sub-image is written onto the OASLM concurrently with the application of the first bipolar voltage pulse.

20. The apparatus of claim 19 wherein the negative sub-image is written onto the OASLM concurrently with the application of the second bipolar voltage pulse.

21. The apparatus of claim 20 further comprising means for applying a read light to the OASLM concurrently with the application of the second bipolar voltage pulse.

22. The apparatus of claim 21 wherein the read light illuminates both the positive sub-image and the negative sub-image.

23. The apparatus of claim 18 wherein the first and second bipolar voltage pulses have unequal amplitudes.

24. A tangible computer-readable medium having instructions stored thereon that, in response to execution by at least one device, cause the at least one device to:
address an electrically addressable spatial light modulator (EASLM) to form a succession of both positive and negative sub-images;
write the positive and negative sub-images onto an optically addressable spatial light modulator (OASLM);
store a plurality of the positive and negative sub-images on the OASLM;
apply a first bipolar voltage pulse to the OASLM while writing one or more of the positive sub-images; and
apply a second and different bipolar voltage pulse to the OASLM while writing one or more of the negative sub-images.

25. The computer-readable medium of claim 24 wherein the OASLM is configured to display a complete image comprising inputs from the positive and negative sub-images.

26. The computer-readable medium of claim 24 wherein the OASLM comprises a plurality of separate OASLM segments arranged in a matrix format to form a single display unit.

27. The computer-readable medium of claim 26 wherein the positive and negative sub-images are alternately received by the plurality of separate OASLM segments, one segment at a time.

28. The computer-readable medium of claim 27 wherein execution of the instructions further cause the at least one device to alternately apply the first and second bipolar voltage pulses to the OASLM.

29. The computer-readable medium of claim 24 wherein execution of the instructions further cause the at least one device to direct a read light towards the OASLM to display a complete image, wherein the complete image comprises both the positive and negative sub-images.

* * * * *

UNITED STATES PATENT AND TRADEMARK OFFICE
CERTIFICATE OF CORRECTION

| | | |
|---|---|---|
| PATENT NO. | : 7,872,793 B2 | Page 1 of 1 |
| APPLICATION NO. | : 12/022109 | |
| DATED | : January 18, 2011 | |
| INVENTOR(S) | : Hughes et al. | |

It is certified that error appears in the above-identified patent and that said Letters Patent is hereby corrected as shown below:

Column 1, line 2, below Title insert -- CROSS-REFERENCE TO RELATED APPLICATION --.

Column 11, line 58, in Claim 1, delete "to;" and insert -- to: --.

Column 11, line 63, in Claim 1, delete "image," and insert -- image; --.

Column 12, line 20, in Claim 7, delete "three dimensional" and insert -- three-dimensional --.

Signed and Sealed this
Twenty-sixth Day of June, 2012

David J. Kappos
*Director of the United States Patent and Trademark Office*